United States Patent
Kubo et al.

(10) Patent No.: US 12,429,347 B2
(45) Date of Patent: Sep. 30, 2025

(54) CONTROL APPARATUS, VEHICLE, AND CONTROL METHOD

(71) Applicant: TOYOTA JIDOSHA KABUSHIKI KAISHA, Toyota (JP)

(72) Inventors: Chikage Kubo, Chofu (JP); Kenichi Yamada, Nisshin (JP); Yuki Tatsumoto, Seto (JP); Hiromitsu Fujii, Kariya (JP); Mitsuhiro Naito, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 227 days.

(21) Appl. No.: 18/357,306

(22) Filed: Jul. 24, 2023

(65) Prior Publication Data
US 2024/0044660 A1 Feb. 8, 2024

(30) Foreign Application Priority Data
Aug. 5, 2022 (JP) .................. 2022-125908

(51) Int. Cl.
G01C 21/34 (2006.01)
B60W 60/00 (2020.01)

(52) U.S. Cl.
CPC ..... *G01C 21/3484* (2013.01); *B60W 60/0025* (2020.02); *B60W 2540/047* (2020.02)

(58) Field of Classification Search
None
See application file for complete search history.

(56) References Cited

U.S. PATENT DOCUMENTS

| | | | |
|---|---|---|---|
| 11,474,519 B2* | 10/2022 | Hicok | G01C 21/3415 |
| 2015/0161533 A1 | 6/2015 | Kawamoto et al. | |
| 2020/0256694 A1* | 8/2020 | Ueda | G08G 1/096888 |
| 2020/0271467 A1* | 8/2020 | Yoshida | H04W 4/024 |
| 2020/0286005 A1* | 9/2020 | Uematsu | G06Q 10/02 |
| 2023/0140268 A1* | 5/2023 | Hochberg | G06Q 10/06315 |
| | | | 701/533 |

FOREIGN PATENT DOCUMENTS

| | | | |
|---|---|---|---|
| JP | 2017033204 A | * | 2/2017 |
| JP | 2020-140264 A | | 9/2020 |
| JP | 2020-144501 A | | 9/2020 |
| WO | 2014/002267 A1 | | 1/2014 |

OTHER PUBLICATIONS

Antonio Bucchiarone, Martina De Sanctis, and Nelly Bencomo, Agent-Based Framework for Self-Organization of Collective and Autonomous Shuttle Fleets, IEEE Transactions on Intelligent Transportation Systems, vol. 22, No. 6, Jun. 2021, p. 3631-3643 (Year: 2021).*

* cited by examiner

*Primary Examiner* — Khoi H Tran
*Assistant Examiner* — Dairon Estevez
(74) *Attorney, Agent, or Firm* — Oliff PLC

(57) ABSTRACT

A control apparatus includes a controller configured to acquire, as profile data, data read from a medium held by each of users when each of the users gets on a vehicle to be operated with the users on board to a destination having a plurality of facilities, identify, based on the acquired profile data, a facility from among the plurality of facilities at which each of the users is to get off the vehicle, and perform control of operating the vehicle along a route including the identified facility.

15 Claims, 8 Drawing Sheets

CONTROL APPARATUS, VEHICLE, AND CONTROL METHOD

CROSS-REFERENCE TO RELATED APPLICATION

This application claims priority to Japanese Patent Application No. 2022-125908 filed on Aug. 5, 2022, the entire contents of which are incorporated herein by reference.

TECHNICAL FIELD

The present disclosure relates to a control apparatus, a vehicle, and a control method.

BACKGROUND

Patent Literature (PTL) 1 discloses a system for managing operations of an on-demand bus.

CITATION LIST

Patent Literature

PTL 1: WO 2014/002267 A1

SUMMARY

In the conventional system, users have to enter desired drop-off locations when booking the on-demand bus.

It would be helpful to save time and effort to enter desired drop-off locations.

A control apparatus according to the present disclosure includes a controller configured to:
  acquire, as profile data, data read from a medium held by each of users when each of the users gets on a vehicle to be operated with the users on board to a destination having a plurality of facilities;
  identify, based on the acquired profile data, a facility from among the plurality of facilities at which each of the users is to get off the vehicle; and
  perform control of operating the vehicle along a route including the identified facility.

A control method according to the present disclosure includes:
  acquiring, by a controller, as profile data, data read from a medium held by each of users when each of the users gets on a vehicle to be operated with the users on board to a destination having a plurality of facilities;
  identifying, by the controller, based on the acquired profile data, a facility from among the plurality of facilities at which each of the users is to get off the vehicle; and
  performing, by the controller, control of operating the vehicle along a route including the identified facility.

According to the present disclosure, time and effort to enter desired drop-off locations can be eliminated.

DETAILED DESCRIPTION

Figure 1:
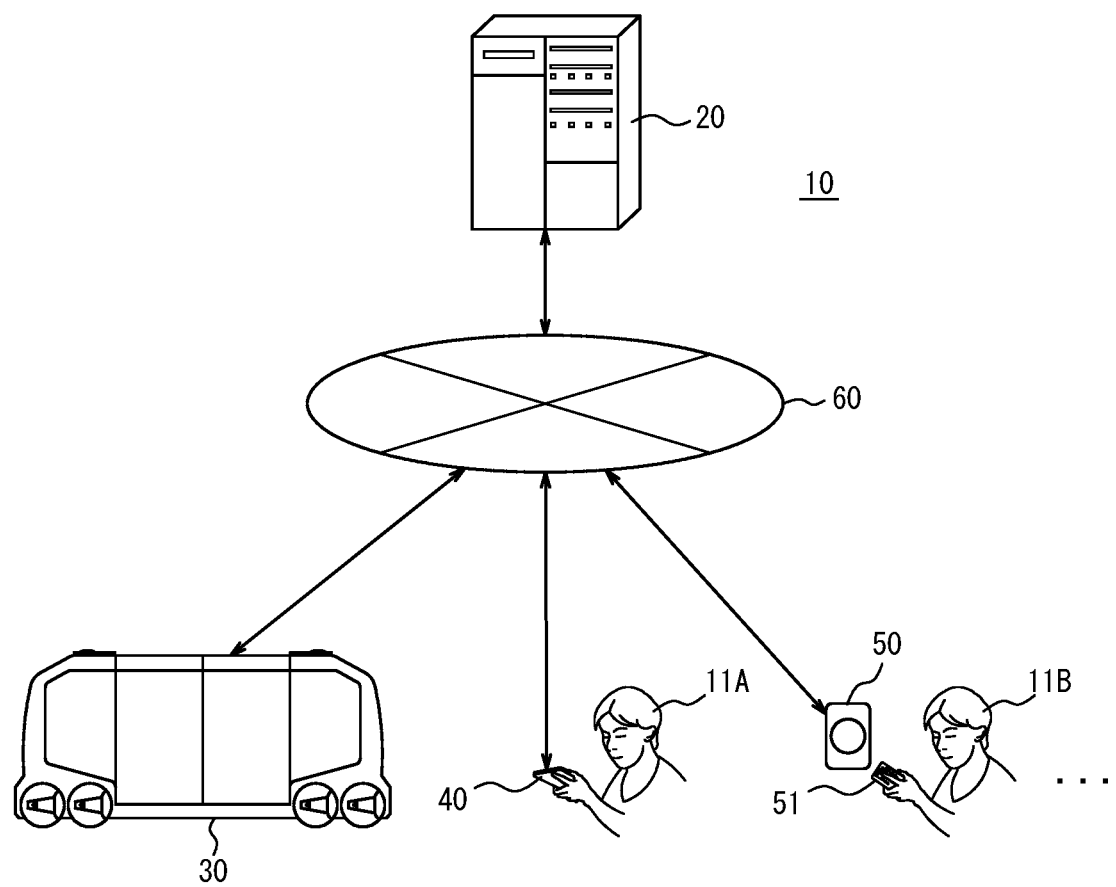
FIG. 1 is a diagram illustrating a configuration of a system according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

A configuration of a system 10 according to the present embodiment will be described with reference to FIG. 1.

The system 10 according to the present embodiment includes a control apparatus 20, a vehicle 30, a terminal apparatus 40, and a card reader 50. The control apparatus 20 can communicate with the vehicle 30, the terminal apparatus 40, and the card reader 50 via a network 60. The card reader 50 can communicate with an employee identification card 51.

The control apparatus 20 is installed in a facility such as a data center and operated by an operator managing the vehicle 30, such as a bus manager. The control apparatus 20 is a computer such as a server that belongs to a cloud computing system or another type of computing system.

The vehicle 30 is to be operated with multiple users on board to a destination. The vehicle 30 is operated as a bus, for example, an on-demand bus. The destination is a factory in the present embodiment, but may be any other location. There are multiple facilities at the destination. The multiple facilities are multiple buildings in the factory in the present embodiment, but can also be multiple facilities in other locations.

The vehicle 30 is, for example, any type of automobile such as a gasoline vehicle, a diesel vehicle, a hydrogen vehicle, an HEV, a PHEV, a BEV, or an FCEV. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle. The vehicle 30, which is an AV in the present embodiment, may be driven by a driver, or the driving may be automated at any level. The term "AV" is an abbreviation of autonomous vehicle. The automation level is, for example, any one of Level 1 to Level 5 according to the level classification defined by SAE. The name "SAE" is an abbreviation of Society of Automotive Engineers. The vehicle 30 may be a MaaS-dedicated vehicle. The term "MaaS" is an abbreviation of Mobility as a Service.

The terminal apparatus 40 is held and used by each of the multiple users, such as a user 11A. The terminal apparatus 40 is, for example, a mobile device such as a mobile phone, a smartphone, or a tablet.

The card reader 50 is mounted in the vehicle 30 and is used to read data from the employee identification card 51. The card reader 50 is, for example, an IC card reader. The term "IC" is an abbreviation of integrated circuit. The employee identification card 51 is held by each of the multiple users, such as a user 11B.

The network 60 includes the Internet, at least one WAN, at least one MAN, or any combination thereof. The term "WAN" is an abbreviation of wide area network. The term "MAN" is an abbreviation of metropolitan area network. The network 60 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

An outline of the present embodiment will be described with reference to FIG. 1.

The control apparatus 20 acquires, as profile data Pd, data read from a medium held by each user, such as the terminal apparatus 40 or the employee identification card 51, when each user gets on the vehicle 30. Based on the acquired profile data Pd, the control apparatus 20 identifies a facility from among the multiple facilities at which each user is to get off. The control apparatus 20 performs control of operating the vehicle 30 along a route Rt that includes the identified facility.

In the present embodiment, the facility at which each user is to get off is automatically identified based on the data read when each user gets on the vehicle 30. Thus, time and effort to enter a desired drop-off location can be eliminated.

In the absence of a prescribed route, destinations of passengers of a bus are usually unknown. However, in the case of commuting use, it is assumed that boarding and drop-off locations are fixed. In the present embodiment, the passengers can register default boarding and drop-off locations. A bus manager can identify a drop-off building from a user profile read at the time of boarding and determine an operating route for the bus. In other words, the bus manager can set the operating route according to who boarding users are. The vehicle 30 can be operated, for example, as a shuttle bus to transport passengers from a station or a parking lot to each building in the factory.

If there is a prescribed route, a bus may stop at a building at which there is no one to drop off, which could result in a loss of time. However, in the present embodiment, a user profile can be read at the time of boarding to identify a drop-off location. The building with no one to drop off can then be ignored and an operating route switched to a shortcut route. Thus, it is easier to optimize the operating route for the bus while reducing time and effort of users.

A work schedule may be taken into account when determining the operating route. Alternatively, priorities may be set based on a job type or a work starting time. Alternatively, depending on a scheduled operation starting time of a line of the factory, in a case in which a person required of that line is on board the bus, the bus may go to a drop-off building for the person first and drop-off buildings for the other passengers later. Alternatively, a drop-off building for a person who works flexi-time may be put off until later. Users may register default commute locations and enter different commute locations only on specific days.

Figure 2:
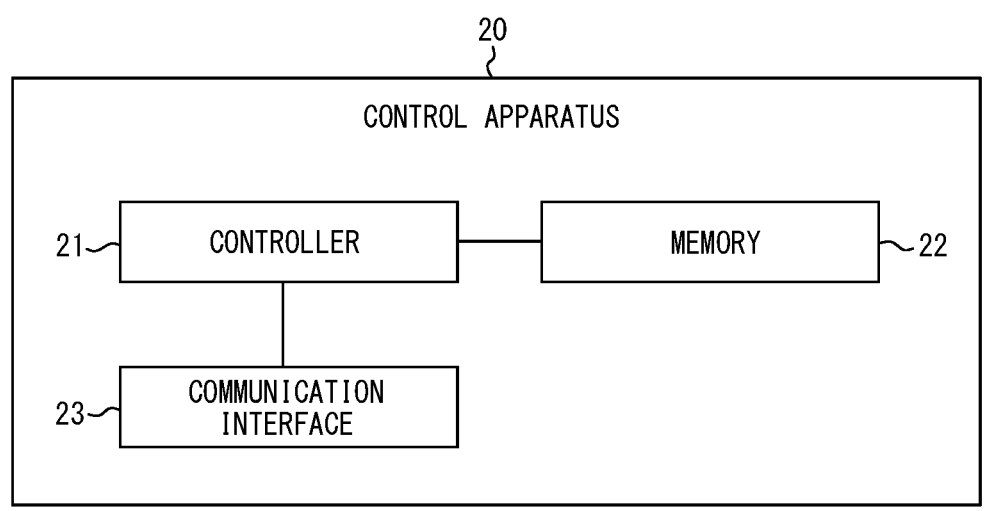
FIG. 2 is a block diagram illustrating a configuration of a control apparatus according to the embodiment of the present disclosure.

A configuration of the control apparatus 20 according to the present embodiment will be described with reference to FIG. 2.

The control apparatus 20 includes a controller 21, a memory 22, and a communication interface 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the control apparatus 20 while controlling components of the control apparatus 20.

The memory 22 includes at least one semiconductor memory, at least one magnetic memory, at least one optical memory, or any combination thereof. The semiconductor memory is, for example, RAM, ROM, or flash memory. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The flash memory is, for example, SSD. The term "SSD" is an abbreviation of solid-state drive. The magnetic memory is, for example, HDD. The term "HDD" is an abbreviation of hard disk drive. The memory 22 functions as, for example, a main memory, an auxiliary memory, or a cache memory. The memory 22 stores data to be used for operations of the control apparatus 20 and data obtained by the operations of the control apparatus 20.

The communication interface 23 includes at least one interface for communication. The interface for communication is, for example, an interface compatible with a wired LAN communication standard such as Ethernet® (Ethernet is a registered trademark in Japan, other countries, or both) or a wireless LAN communication standard such as IEEE802.11. The name "IEEE" is an abbreviation of Institute of Electrical and Electronics Engineers. The communication interface 23 communicates with the vehicle 30, the terminal apparatus 40, and the card reader 50. The communication interface 23 receives data to be used for the operations of the control apparatus 20, and transmits data obtained by the operations of the control apparatus 20.

The functions of the control apparatus 20 are realized by execution of a program according to the present embodiment by a processor serving as the controller 21. That is, the functions of the control apparatus 20 are realized by software. The program causes a computer to execute the operations of the control apparatus 20, thereby causing the computer to function as the control apparatus 20. That is, the computer executes the operations of the control apparatus 20 in accordance with the program to thereby function as the control apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the control apparatus 20 may be realized by a programmable circuit or a dedicated circuit serving as the controller 21. That is, some or all of the functions of the control apparatus 20 may be realized by hardware.

Operations of the control apparatus 20 according to the present embodiment will be described with reference to FIG. 3. These operations correspond to a control method according to the present embodiment.

In step S101, the controller 21 of the control apparatus 20 determines whether a user has got on the vehicle 30. Specifically, the controller 21 determines that the user 11A has got on the vehicle 30 upon being notified by the vehicle 30 or the terminal apparatus 40 via the communication interface 23 that short-range wireless communication has taken place between the terminal apparatus 40 and a receiver, which is installed in the vehicle 30 and compatible with a short-range wireless communication standard such as Bluetooth® (Bluetooth is a registered trademark in Japan, other countries, or both). The controller 21 determines that the user 11B has got on the vehicle 30 upon being notified by the vehicle 30 or the card reader 50 via the communication interface 23 that the employee identification card 51 has been held over the card reader 50.

The controller 21 of the control apparatus 20 may determine that the user 11A has got on the vehicle 30 upon receiving the fact that the position of the terminal apparatus 40 matches the position of the vehicle 30, even without notification from the vehicle 30 or the terminal apparatus 40. In such a variation, the controller 21 receives, from the vehicle 30 via the communication interface 23, a positioning result obtained by a GNSS receiver mounted on the vehicle 30. The term "GNSS" is an abbreviation of global navigation satellite system. GNSS is, for example, GPS, QZSS, BDS, GLONASS, or Galileo. The term "GPS" is an abbreviation of Global Positioning System. The term "QZSS" is an abbreviation of Quasi-Zenith Satellite System. QZSS satellites are called quasi-zenith satellites. The term "BDS" is an abbreviation of BeiDou Navigation Satellite System. The term "GLONASS" is an abbreviation of Global Navigation Satellite System. The controller 21 receives, from the terminal apparatus 40 via the communication interface 23, a positioning result obtained by a GNSS receiver mounted on the terminal apparatus 40. The controller 21 compares the position of the terminal apparatus 40 indicated by the positioning result received from the terminal apparatus 40 with the position of the vehicle 30 indicated by the positioning result received from the vehicle 30. The controller 21 determines that the user 11A has got on the vehicle 30 in a case in which the position of the terminal apparatus 40 matches the position of the vehicle 30. The controller 21 determines that the user 11A has not got on the vehicle 30 in a case in which the position of the terminal apparatus 40 does not match the position of the vehicle 30.

In a case in which it is determined in step S101 that the user has not got on the vehicle 30, i.e., the user's boarding on the vehicle 30 is not detected, the process of step S101 is performed again. In a case in which it is determined in step S101 that the user has got on the vehicle 30, i.e., the user's boarding on the vehicle 30 is detected, the process in step S102 is performed.

In step S102, the controller 21 of the control apparatus 20 acquires, as profile data Pd, data read from the medium held by the user when the user has got on the vehicle 30. Specifically, the controller 21 acquires profile data PdA on the user 11A by receiving, from the vehicle 30 via the communication interface 23, data received from the terminal apparatus 40 when the short-range wireless communication is performed between the terminal apparatus 40 and the receiver mounted in the vehicle 30. The controller 21 acquires profile data PdB on the user 11B by receiving, from the vehicle 30 or the card reader 50 via the communication interface 23, data read from the employee identification card 51 when the employee identification card 51 is held over the card reader 50.

In the present embodiment, the controller 21 of the control apparatus acquires, as profile data Pd, identification data that uniquely identifies each user. In other words, the controller 21 acquires, as the profile data PdA, identification data that identifies the user 11A. The controller 21 acquires, as the profile data PdB, identification data that identifies the user 11B.

Figure 4:
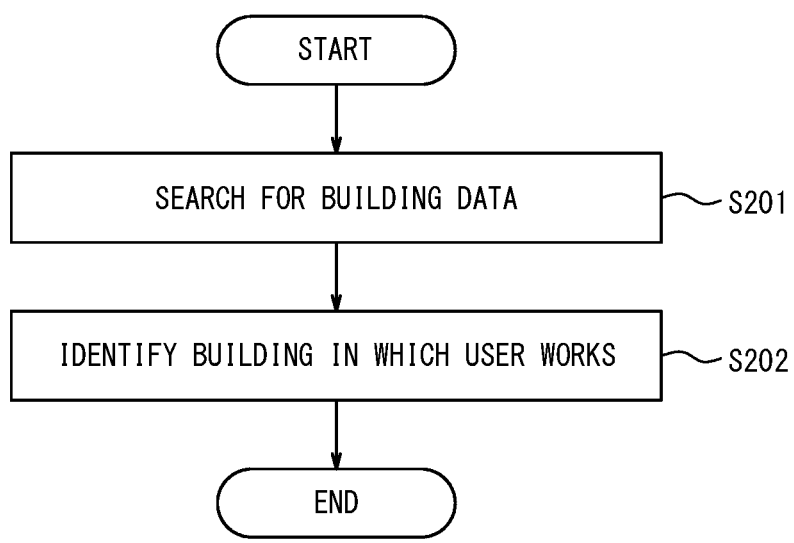
FIG. 4 is a flowchart illustrating a specific procedure of the process in step S103 of FIG. 3.

In step S103, the controller 21 of the control apparatus 20 identifies, based on the profile data Pd acquired in step S102, a facility at which the user is to get off, from among the multiple facilities in the destination. FIG. 4 illustrates a specific procedure.

In step S201 of FIG. 4, the controller 21 of the control apparatus 20 searches a database Db for building data indicating a building in which a user identified by the profile data Pd works. In other words, in a case in which the profile data PdA is acquired in step S102, the controller 21 searches the database Db for building data indicating a building in which the user 11A works. In a case in which the profile data PdB is acquired in step S102, the controller 21 searches the database Db for building data indicating a building in which the user 11B works.

The database Db is built in the memory 22 of the control apparatus 20. Alternatively, the database Db may be built in an external storage to which the communication interface 23 of the control apparatus 20 can be connected.

In step S202 of FIG. 4, the controller 21 of the control apparatus 20 identifies the building indicated by the building data obtained in step S201, as a facility at which the user identified by the profile data Pd is to get off. In other words, in a case in which the profile data PdA is acquired in step S102, the controller 21 identifies the building in which the user 11A works, as a facility at which the user 11A is to get off. In a case in which the profile data PdB is acquired in step S102, the controller 21 identifies the building in which the user 11B works, as a facility at which the user 11B is to get off.

Instead of acquiring the identification data as the profile data Pd, the controller 21 of the control apparatus 20 may acquire building data indicating a building in which each user works, as the profile data Pd. In such a variation, the controller 21 identifies a building indicated by the profile data Pd as a facility at which each user is to get off. In other words, the controller 21 identifies a building indicated by the profile data PdA, as a facility at which the user 11A is to get off. The controller 21 identifies a building indicated by the profile data PdB, as a facility at which the user 11B is to get off.

In step S104, the controller 21 of the control apparatus 20 sets a route Rt to operate the vehicle 30 such that the route Rt includes the facility identified in step S103. The controller 21 performs control of operating the vehicle 30 along the set route Rt. Specifically, in a case in which a route Rt has not yet been created, the controller 21 creates a new route including the facility identified in step S103, as a route Rt. In a case in which a route Rt has already been created and the facility is not included in the route Rt, the controller 21 updates the route Rt to include the facility. The controller 21 transmits an operation command to travel along the created or updated route Rt to the vehicle 30 via the communication interface 23. The vehicle 30 travels along the route Rt autonomously according to the operation command in the present embodiment, but may travel along the route Rt by notifying a driver of the operation command and being driven manually by the driver according to the operation command.

Figure 5:
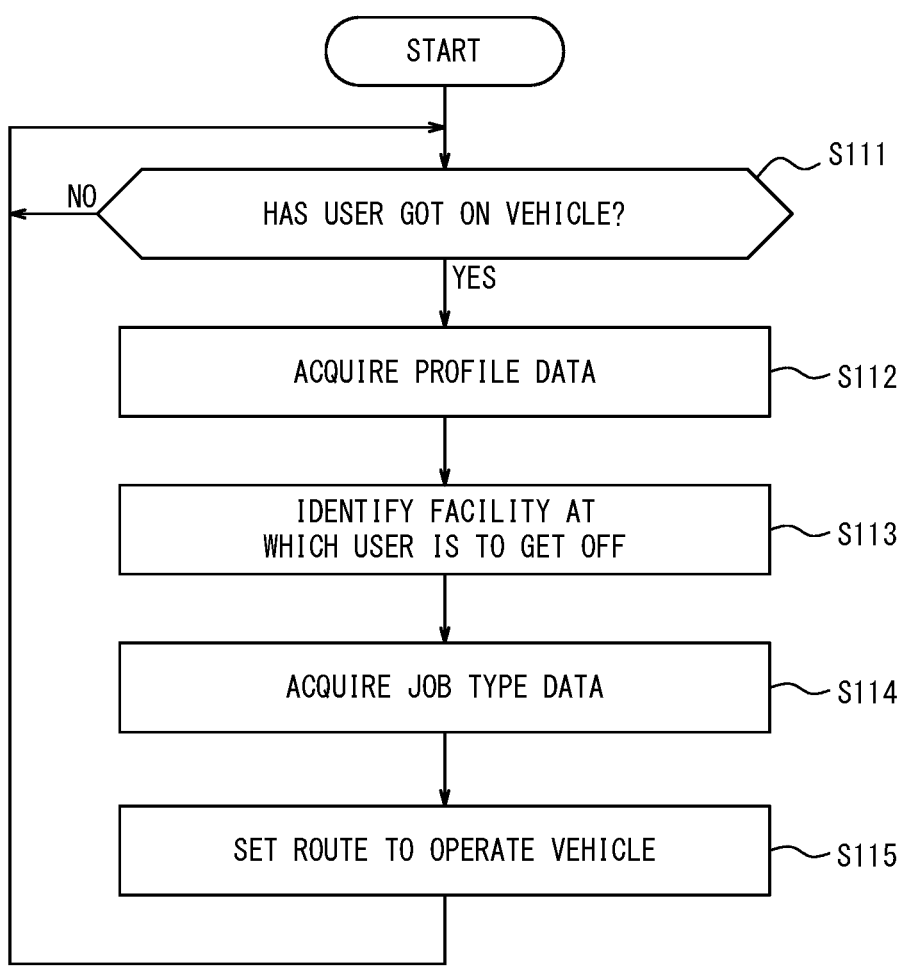
FIG. 5 is a flowchart illustrating a variation of the operations of the control apparatus according to the embodiment of the present disclosure.

A variation of operations of the control apparatus 20 according to the present embodiment will be described with reference to FIG. 5. In this variation, the controller 21 of the control apparatus 20 further acquires job type data indicating a job type of each user.

Figure 3:
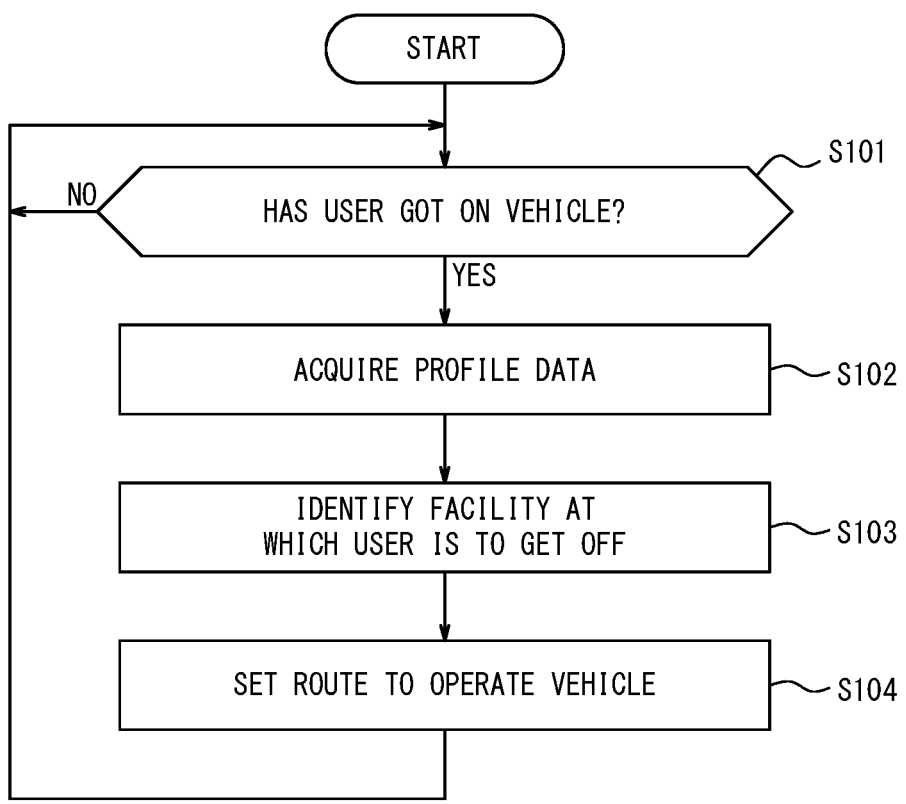
FIG. 3 is a flowchart illustrating operations of the control apparatus according to the embodiment of the present disclosure.

The processes in steps S111 to S113 are the same as the processes in steps S101 to S103 of FIG. 3, respectively, and thus descriptions thereof are omitted.

In step S114, the controller 21 of the control apparatus 20 searches the database Db for job type data indicating a job type of a user identified by the profile data Pd acquired in step S112. In other words, in a case in which the profile data PdA is acquired in step S112, the controller 21 searches the database Db for job type data indicating a job type of the user 11A. In a case in which the profile data PdB is acquired in step S112, the controller 21 searches the database Db for job type data indicating a job type of the user 11B. Alternatively, in a case in which job type data indicating a user's job type is also read from a medium held by the user when the user gets on the vehicle 30, the controller 21 may acquire the read job type data. Specifically, the controller 21 may acquire job type data indicating a job type of the user 11A by receiving, from the vehicle 30 via the communication interface 23, the job type data received from the terminal apparatus 40 when the short-range wireless communication is performed between the terminal apparatus 40 and the receiver mounted in the vehicle 30. The controller 21 may acquire job type data indicating a job type of the user 11B by receiving, from the vehicle 30 or the card reader 50 via the communication interface 23, the job type data read from the employee identification card 51 when the employee identification card 51 is held over the card reader 50.

In step S115, when setting a route Rt to include the facility identified in step S113, the controller 21 of the control apparatus 20 adjusts an order of traveling of the vehicle 30 around facilities included in the route Rt according to the job type indicated by the job type data acquired in step S114. For example, in a case in which a scheduled operation starting time of a certain line is imminent and a user's job type is required of that line on that day, the route Rt may be set so that the vehicle 30 passes first through a building at which the user is to get off. The control of operating the vehicle 30 along the set route Rt is the same as control in step S104 of FIG. 3, so the explanation is omitted.

Figure 6:
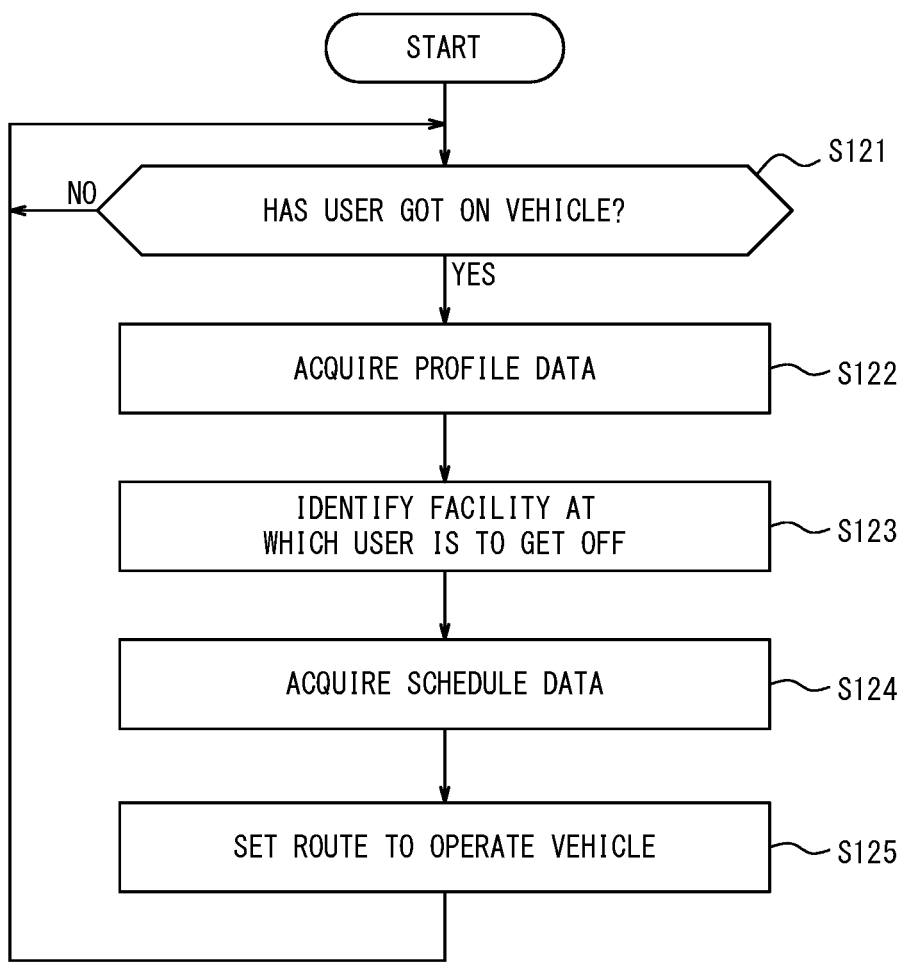
FIG. 6 is a flowchart illustrating another variation of the operations of the control apparatus according to the embodiment of the present disclosure.

Another variation of the operations of the control apparatus 20 according to the present embodiment will be described with reference to FIG. 6. In this variation, the controller 21 of the control apparatus 20 further acquires schedule data indicating a work starting time of each user.

The processes in steps S121 to S123 are the same as the processes in steps S101 to S103 of FIG. 3, respectively, and thus descriptions thereof are omitted.

In step S124, the controller 21 of the control apparatus 20 searches the database Db for schedule data indicating a work starting time of a user identified by the profile data Pd acquired in step S122. In other words, in a case in which the profile data PdA is acquired in step S122, the controller 21 searches the database Db for schedule data indicating a work starting time of the user 11A. In a case in which the profile data PdB is acquired in step S122, the controller 21 searches the database Db for schedule data indicating a work starting time of the user 11B. Alternatively, in a case in which schedule data indicating a work starting time of a user is also read from a medium held by the user when the user gets on the vehicle 30, the controller 21 may acquire the read schedule data. Specifically, the controller 21 may acquire schedule data indicating a work starting time of the user 11A by receiving, from the vehicle 30 via the communication interface 23, the schedule data received from the terminal apparatus 40 when the short-range wireless communication is performed between the terminal apparatus 40 and the receiver mounted in the vehicle 30. The controller 21 may acquire schedule data indicating a work starting time of the user 11B by receiving, from the vehicle 30 or the card reader 50 via the communication interface 23, the schedule data read from the employee identification card 51 when the employee identification card 51 is held over the card reader 50.

In step S125, when setting a route Rt to include the facility identified in step S123, the controller 21 of the control apparatus 20 adjusts an order of traveling of the vehicle 30 around facilities included in the route Rt according to the work starting time indicated by the schedule data acquired in step S124. For example, in a case in which a scheduled operation starting time of a certain line is imminent and a user is scheduled to perform work such as assembling parts on the line that day, the route Rt may be set so that the vehicle 30 passes first through a building at which the user is to get off. In a case in which a user works a flexible work schedule, the route Rt may be set so that the vehicle 30 passes last a building at which the user is to get off. That is, in an order of traveling of the vehicle 30 around facilities included in the route Rt, the controller 21 may put off a facility at which a user whose work starting time is not indicated in the schedule data is to get off. The control of operating the vehicle 30 along the set route Rt is the same as control in step S104 of FIG. 3, so the explanation is omitted.

Figure 7:
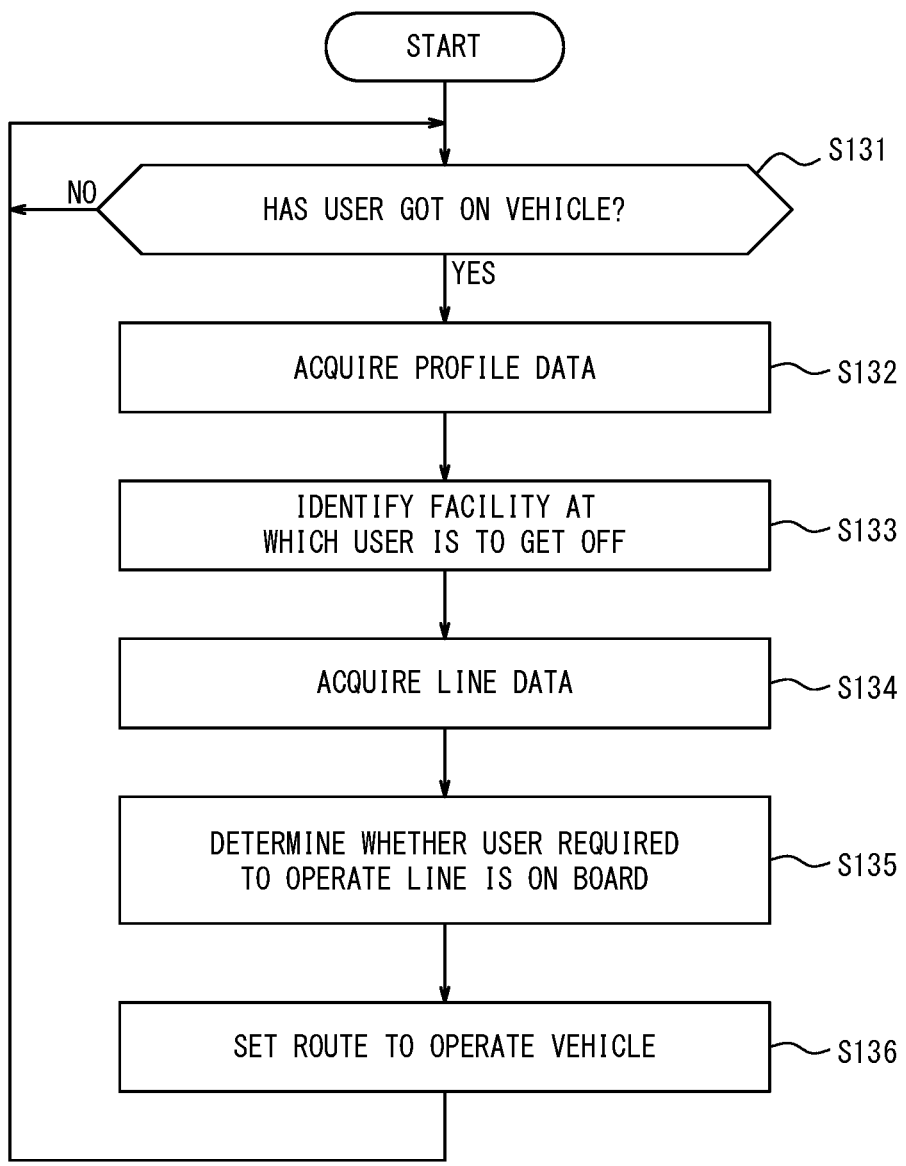
FIG. 7 is a flowchart illustrating yet another variation of the operations of the control apparatus according to the embodiment of the present disclosure.

Yet another variation of the operations of the control apparatus 20 according to the present embodiment will be described with reference to FIG. 7. In this variation, the controller 21 of the control apparatus 20 further acquires line data indicating a user that is required to operate each line in the factory.

The processes in steps S131 to S133 are the same as the processes in steps S101 to S103 of FIG. 3, respectively, and thus descriptions thereof are omitted.

In step S134, the controller 21 of the control apparatus 20 acquires line data indicating a user that is required to operate each line in the factory. Specifically, the controller 21 acquires the day's line data from the database Db.

In step S135, the controller 21 of the control apparatus 20 determines, based on the profile data Pd acquired in step S132, whether the user indicated by the line data acquired in step S134 is on board. Specifically, when a user identified by the profile data Pd acquired in step S122 matches the user indicated by the line data acquired in step S134, who is required to operate any one of lines in the factory, the controller 21 determines that the user required to operate the line is on board. When a user identified by the profile data Pd acquired in step S122 does not match any user required to operate any line in the factory, as indicated by the line data acquired in step S134, the controller 21 determines that no user required to operate any line is on board.

In step S136, when setting a route Rt to include the facility identified in step S133, the controller 21 of the control apparatus 20 adjusts an order of traveling of the vehicle 30 around facilities included in the route Rt according to a determination result obtained in step S135. For example, in a case in which a scheduled operation starting time of a certain line is imminent and a user is a person required of that line on that day, the route Rt may be set so that the vehicle 30 passes first through a building at which the user is to get off. In other words, upon determining that time remaining until a scheduled operation starting time of a certain line is below a threshold and that a user required to operate the line is on board, the controller 21 may put off facilities other than a facility with the line, in the order of traveling of the vehicle 30 around the facilities included in the route Rt. The control of operating the vehicle 30 along the set route Rt is the same as control in step S104 of FIG. 3, so the explanation is omitted.

Figure 8:
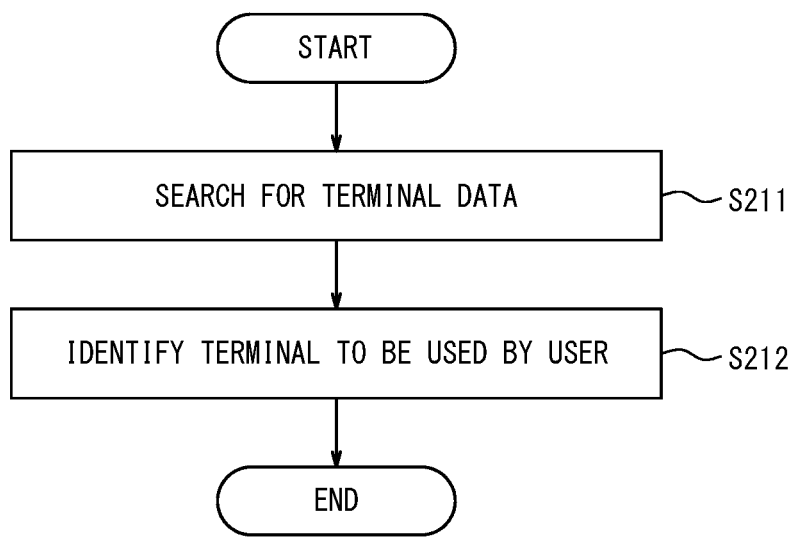
FIG. 8 is a flowchart illustrating a specific procedure of the process in step S103 of FIG. 3 in the case of replacing a factory-bound vehicle with an airport-bound vehicle.

The destination is the factory in the present embodiment, but may be an airport. The multiple facilities at the destination are the multiple buildings in the factory in the present embodiment, but may be multiple terminals in the airport. In other words, the factory-bound vehicle may be replaced by an airport-bound vehicle. FIG. 8 illustrates a specific procedure of the process in step S103 of FIG. 3 in such a case.

In step S211 of FIG. 8, the controller 21 of the control apparatus 20 searches the database Db for terminal data indicating a terminal to be used by a user identified by the profile data Pd. In other words, in a case in which the profile data PdA is acquired in step S102, the controller 21 searches the database Db for terminal data indicating a terminal to be used by the user 11A.

In step S212 of FIG. 8, the controller 21 of control apparatus 20 identifies the terminal indicated by the terminal data obtained in step S211 as a facility at which the user identified by the profile data Pd is to get off. In other words, in a case in which the profile data PdA is acquired in step S102, the controller 21 identifies the terminal to be used by the user 11A as a facility at which the user 11A is to get off.

Instead of acquiring the identification data as the profile data Pd, the controller 21 of the control apparatus 20 may acquire terminal data indicating a terminal to be used by each user as the profile data Pd. In such a variation, the controller 21 identifies the terminal indicated by the profile data Pd, as a facility at which each user is to get off. In other words, the controller 21 identifies a terminal indicated by the profile data PdA as a facility at which the user 11A is to get off.

As a variation of the present embodiment, the control apparatus 20 may be provided in the vehicle 30.

Examples of some embodiments of the present disclosure are described below. However, it should be noted that the embodiments of the present disclosure are not limited to these examples.

[Appendix 1] A control apparatus comprising a controller configured to:
  acquire, as profile data, data read from a medium held by each of users when each of the users gets on a vehicle to be operated with the users on board to a destination having a plurality of facilities;
  identify, based on the acquired profile data, a facility from among the plurality of facilities at which each of the users is to get off the vehicle; and
  perform control of operating the vehicle along a route including the identified facility.

[Appendix 2] The control apparatus according to appendix 1, wherein
  the destination is a factory, and
  the plurality of facilities is a plurality of buildings.

[Appendix 3] The control apparatus according to appendix 2, wherein the controller is configured to:
  acquire, as the profile data, identification data uniquely identifying each of the users;
  search a database for building data indicating a building in which a user identified by the profile data works; and
  identify the building indicated by the obtained building data, as a facility at which the user is to get off the vehicle.

[Appendix 4] The control apparatus according to appendix 3, further comprising a memory in which the database is built.

[Appendix 5] The control apparatus according to appendix 3, further comprising a communication interface configured to be connected to an external storage in which the database is built.

[Appendix 6] The control apparatus according to appendix 2, wherein the controller is configured to:
  acquire, as the profile data, building data indicating a building in which each of the users works; and
  identify the building indicated by the profile data, as a facility at which each of the users is to get off the vehicle.

[Appendix 7] The control apparatus according to any one of appendices 2 to 6, wherein the controller is configured to:
  further acquire job type data indicating a job type of each of the users; and
  adjust, according to the job type indicated by the acquired job type data, an order of traveling of the vehicle around facilities included in the route.

[Appendix 8] The control apparatus according to any one of appendices 2 to 6, wherein the controller is configured to:
further acquire schedule data indicating a work starting time of each of the users; and
adjust, according to the work starting time indicated by the acquired schedule data, an order of traveling of the vehicle around facilities included in the route.

[Appendix 9] The control apparatus according to appendix 8, wherein the controller is configured to put off a facility at which a user whose work starting time is not indicated in the schedule data is to get off, in the order of traveling of the vehicle around the facilities included in the route.

[Appendix 10] The control apparatus according to any one of appendices 2 to 6, wherein the controller is configured to:
further acquire line data indicating a user required to operate each line in the factory;
determine, based on the profile data, whether the user indicated by the acquired line data is on board the vehicle; and
adjust, according to an obtained determination result, an order of traveling of the vehicle around facilities included in the route.

[Appendix 11] The control apparatus according to appendix 10, wherein upon determining that time remaining until a scheduled operation starting time of a line is below a threshold and that a user required to operate the line is on board the vehicle, the controller is configured to put off facilities other than a facility with the line, in the order of traveling of the vehicle around the facilities included in the route.

[Appendix 12] The control apparatus according to any one of appendices 2 to 11, wherein the medium is an employee identification card of each of the users.

[Appendix 13] The control apparatus according to appendix 1, wherein
the destination is an airport, and
the plurality of facilities is a plurality of terminals.

[Appendix 14] The control apparatus according to appendix 13, wherein the controller is configured to:
acquire, as the profile data, identification data uniquely identifying each of the users;
search a database for terminal data indicating a terminal to be used by a user identified by the profile data; and
identify the terminal indicated by the obtained terminal data, as a facility at which the user is to get off the vehicle.

[Appendix 15] The control apparatus according to appendix 14, further comprising a memory in which the database is built.

[Appendix 16] The control apparatus according to appendix 14, further comprising a communication interface configured to be connected to an external storage in which the database is built.

[Appendix 17] The control apparatus according to appendix 13, wherein the controller is configured to:
acquire, as the profile data, terminal data indicating a terminal to be used by each of the users; and
identify the terminal indicated by the profile data, as a facility at which each of the users is to get off the vehicle.

[Appendix 18] A vehicle comprising the control apparatus according to any one of appendices 1 to 17.

[Appendix 19] A control method comprising:
acquiring, by a controller, as profile data, data read from a medium held by each of users when each of the users gets on a vehicle to be operated with the users on board to a destination having a plurality of facilities;
identifying, by the controller, based on the acquired profile data, a facility from among the plurality of facilities at which each of the users is to get off the vehicle; and
performing, by the controller, control of operating the vehicle along a route including the identified facility.

[Appendix 20] The control method according to appendix 19, wherein
the destination is a factory, and
the plurality of facilities is a plurality of buildings.

The present disclosure is not limited to the embodiment described above. For example, two or more blocks described in the block diagrams may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

The invention claimed is:

1. A control apparatus comprising a controller configured to:
acquire, as profile data, data read from a medium held by each of users when each of the users gets on a vehicle to be operated with the users on board to a destination having a plurality of facilities, wherein the destination includes a factory, and the plurality of facilities include a plurality of buildings;
identify, based on the acquired profile data, a facility from among the plurality of facilities at which each of the users is to get off the vehicle;
set a route including the identified facility;
acquire line data indicating a user required to operate each line in the factory;
determine, based on the profile data, whether the user indicated by the acquired line data is on board the vehicle;
upon determining that time remaining until a scheduled operation starting time of a first line is below a threshold and that a first user required to operate the first line is on board the vehicle, adjust an order of traveling of the vehicle around facilities included in the route by putting off facilities other than a first facility with the first line; and
control, by transmitting an operation command to the vehicle, the vehicle to autonomously travel along the route in the adjusted order.

2. The control apparatus according to claim 1, wherein the controller is further configured to:
acquire, as the profile data, identification data uniquely identifying each of the users;
search a database for building data indicating a building in which a user identified by the profile data works; and
identify the building indicated by the obtained building data, as a facility at which the user is to get off the vehicle.

3. The control apparatus according to claim 2, further comprising a memory in which the database is built.

4. The control apparatus according to claim 2, further comprising a communication interface configured to be connected to an external storage in which the database is built.

5. The control apparatus according to claim 1, wherein the controller is further configured to:
   acquire, as the profile data, building data indicating a building in which each of the users works; and
   identify the building indicated by the profile data, as a facility at which each of the users is to get off the vehicle.

6. The control apparatus according to claim 1, wherein the controller is further configured to:
   further acquire job type data indicating a job type of each of the users; and
   adjust, according to the job type indicated by the acquired job type data, the order of traveling of the vehicle around the facilities included in the route.

7. The control apparatus according to claim 1, wherein the controller is further configured to:
   further acquire schedule data indicating a work starting time of each of the users; and
   adjust, according to the work starting time indicated by the acquired schedule data, the order of traveling of the vehicle around the facilities included in the route.

8. The control apparatus according to claim 7, wherein the controller is further configured to put off a facility at which a user whose work starting time is not indicated in the schedule data is to get off, in the order of traveling of the vehicle around the facilities included in the route.

9. The control apparatus according to claim 1, wherein the medium is an employee identification card of each of the users.

10. A vehicle comprising the control apparatus according to claim 1.

11. A control method performed by a controller, comprising:
   acquiring, as profile data, data read from a medium held by each of users when each of the users gets on a vehicle to be operated with the users on board to a destination having a plurality of facilities, wherein the destination includes a factory, and the plurality of facilities include a plurality of buildings;
   identifying, based on the acquired profile data, a facility from among the plurality of facilities at which each of the users is to get off the vehicle;
   setting a route including the identified facility;
   acquiring line data indicating a user required to operate each line in the factory;
   determining, based on the profile data, whether the user indicated by the acquired line data is on board the vehicle;
   upon determining that time remaining until a scheduled operation starting time of a first line is below a threshold and that a first user required to operate the first line is on board the vehicle, adjusting an order of traveling of the vehicle around facilities included in the route by putting off facilities other than a first facility with the first line; and
   controlling, by transmitting an operation command to the vehicle, the vehicle to autonomously travel along the route in the adjusted order.

12. The control apparatus according to claim 1, wherein the controller is further configured to:
   acquire, as the profile data, identification data uniquely identifying each of the users; and
   determine that the first user is on board the vehicle when the user identified by the profile data matches the first user indicated by the acquired line data.

13. The control apparatus according to claim 1, wherein the controller is further configured to:
   acquire, as the profile data, identification data uniquely identifying each of the users; and
   determine that no user required to operate any line in the factory is on board when the user identified by the profile data does not match any user required to operate any line in the factory, which is indicated by the line data.

14. The control apparatus according to claim 1, wherein the controller is further configured to adjust the order of traveling of the vehicle so that the vehicle passes first through the first facility at which the first user is to get off.

15. The control apparatus according to claim 1, wherein the medium is a terminal apparatus of each of the users, and
   the controller is further configured to acquire the profile data on each user by receiving, from the vehicle, data received from the terminal apparatus of the user when short-range wireless communication is performed between the terminal apparatus of the user and a receiver mounted in the vehicle.

* * * * *